United States Patent
van Willigen

(10) Patent No.: US 8,074,525 B2
(45) Date of Patent: Dec. 13, 2011

(54) MAGNETIC-INDUCTIVE FLOWMETER

(75) Inventor: Arnaout Leendert van Willigen, Capelle an den Ijssel (NL)

(73) Assignee: Krohne AG, Basel (CH)

( * ) Notice: Subject to any disclaimer, the term of this patent is extended or adjusted under 35 U.S.C. 154(b) by 62 days.

(21) Appl. No.: 12/625,674

(22) Filed: Nov. 25, 2009

(65) Prior Publication Data
US 2010/0132479 A1    Jun. 3, 2010

(30) Foreign Application Priority Data

Nov. 26, 2008 (DE) .......................... 10 2008 059 067

(51) Int. Cl.
*G01F 1/58* (2006.01)
(52) U.S. Cl. .................................................. 73/861.12
(58) Field of Classification Search ............... 73/861.08, 73/861.11–861.13
See application file for complete search history.

(56) References Cited

U.S. PATENT DOCUMENTS

| | | | |
|---|---|---|---|
| 4,036,052 A | | 7/1977 | Searle |
| 4,308,752 A | * | 1/1982 | Appel et al. ............... 73/861.12 |
| 4,388,834 A | | 6/1983 | Schmoock |
| 4,565,619 A | | 1/1986 | Gardner et al. |
| 5,503,026 A | | 4/1996 | Böhm et al. |
| 5,503,027 A | * | 4/1996 | Hemp ......................... 73/861.12 |
| 6,877,386 B2 | | 4/2005 | Needham et al. |
| 7,383,739 B2 | | 6/2008 | Hofmann |
| 7,412,901 B2 | | 8/2008 | Baecker et al. |
| 2008/0148810 A1 | | 6/2008 | Boehm et al. |

FOREIGN PATENT DOCUMENTS

| | | |
|---|---|---|
| DE | 29 50 039 A1 | 7/1981 |
| DE | 40 13 634 A1 | 10/1991 |
| DE | 41 39 915 A1 | 8/1992 |
| DE | 10 2007 005 898 A1 | 8/2008 |
| EP | 0 116 875 A1 | 8/1984 |
| EP | 0 274 768 A1 | 7/1988 |
| EP | 0 420 496 A1 | 4/1991 |
| EP | 0 769 680 A1 | 4/1997 |
| EP | 0 977 018 A1 | 2/2000 |
| GB | 2 403 016 A | 12/2004 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A magnetic-inductive flowmeter for measuring the rate of flow of a flowing medium, having a measurement line, a magnetic field generating means for generating a magnetic field which at least partially penetrates the measurement line, and two measurement electrodes, and an electrically insulating cover layer provided at least partially over the inside of the measurement line, the measurement electrodes being strip-shaped having a length in a peripheral direction of the measurement line of between about just under one fourth of the periphery of the measurement line to about just over half the periphery of the measurement line and being exposed to the interior of the measurement line to be in direct, contact with the flowing medium. The measurement electrodes can be made of the same material or a similar material as the cover layer, but having a much higher electrical conductivity than the material of the cover layer.

19 Claims, 4 Drawing Sheets

MAGNETIC-INDUCTIVE FLOWMETER

BACKGROUND OF THE INVENTION

1. Field of Invention

The invention relates to a magnetic-inductive flowmeter for measuring the rate of flow of a flowing medium, with a measurement line, a magnetic field generating means for generating a magnetic field which at least partially penetrates the measurement line, and with two measurement electrodes for detecting and tapping a measurement voltage which has been induced in the flowing medium, the measurement line being provided at least partially with an electrically insulating cover layer inside, and the measurement voltage can be galvanically or capacitively tapped by the measurement electrodes. Here, a magnetic-inductive flowmeter is assumed whose measurement line is electrically conductive and which, therefore, has a metallic measurement line; only then is at least partially an electrically insulating cover layer necessary. This electrically insulating cover layer is provided at least in the region of the measurement electrodes. The dimension which the cover layer should at least have depends on the diameter of the measurement line. Usually the cover layer in the lengthwise direction of the measurement line has expansion which corresponds to roughly at least twice the diameter of the measurement line. However, the measurement line can, then, also partially or entirely be provided with a cover layer when it is not electrically conductive. Usually, but not functionally necessarily, does a housing which holds the measurement line, and preferably also the magnetic field generating means and the measurement electrodes, belong to the magnetic-inductive flowmeter of the type under consideration, the housing conventionally having a round cross section.

2. Description of Related Art

Magnetic-inductive flowmeters have been very widely known for decades in the prior art; in this regard, reference is made by way of example to literature citation *Technical Flow Rate Measurement* by Prof. Dr. Ing. K. W. Bonfig, 3rd edition, Vulkan-Verlag Essen, 2002, pages 123 to 167 (compare also, German patent applications 196 37 761, 197 52 368 and 10 2007 003 614 and European patent applications 0 274 768 (U.S. Pat. No. 4,920,795), 0 762 084 (U.S. Pat. No. 5,925, 830) and 1 764 587 (U.S. Pat. No. 7,412,901)).

The underlying principle of a magnetic-inductive flowmeter for measurement of the rate of flow of a flowing medium goes back to Faraday who as early as 1832 suggested using the principle of electrodynamic induction for measurement of the flow velocity of a flowing medium. According to the Faraday Induction Law, in a flowing medium which is entraining charge carriers and flowing through a magnetic field, an electrical field intensity forms perpendicular to the flow direction and perpendicular to the magnetic field. The Faraday Induction Law is used in a magnetic-inductive flowmeter by a magnetic field being generated by a magnetic field generating means which conventionally has two energized magnet coils and being routed at least partially through a measurement line, the generated magnetic field having at least one component which runs perpendicular to the flow direction. Within the magnetic field each volumetric element of the flowing medium which has a certain number of charge carriers and which is moving through the magnetic field with the field intensity which arises in this volumetric element contributes to a measurement voltage which can be tapped galvanically or capacitively and which can be detected by the measurement electrode.

If, as stated above, magnetic-inductive flowmeters have been extensively known for decades in an almost unimaginable number of embodiments, with reference to magnetic-inductive flowmeters, as in many extensively developed areas of engineering, progress is still desirable and also possible. This also applies to a special degree to the measurement electrodes of these magnetic-inductive flowmeters.

In magnetic-inductive flowmeters of the type under consideration, the flowing medium can be a gas-free or at least largely gas-free liquid, but the flowing medium can also be a liquid which contains more or fewer portions of gas. Otherwise in the magnetic-inductive flowmeters under consideration the measurement line can be completely filled or also only partially filled according to operation.

It was stated at the beginning that the invention relates to a magnetic-inductive flowmeter for measuring the flow rate of a flowing medium. This magnetic-inductive flowmeter however allows not only measurement of the rate of flow of a flowing medium, but also measurement of conductivity and/or measurement of the liquid level, with liquid level measurement the information being available whether the measurement line is completely or partially filled. Consequently a magnetic-inductive flowmeter of the initially explained type can be used for flow rate measurement, for conductivity measurement and/or for liquid level measurement. Conventionally, magnetic-inductive flowmeters are used not only for conductivity measurement and not only for liquid level measurement. If rather there is also conductivity measurement and/or liquid level measurement, a magnetic-inductive flowmeter of the type under consideration is generally used for measurement of flow rate and measurement of conductivity, for flow rate measurement and liquid level measurement or for flow rate measurement, conductivity measurement and liquid level measurement. But it is also possible to use this magnetic-inductive flowmeter also only for conductivity measurement, only for liquid level measurement or only for conductivity measurement and liquid level measurement. But a magnetic-inductive flowmeter for measuring the flow rate of a flowing medium is always assumed below. Nevertheless, what is detailed below also always applies to a magnetic-inductive flowmeter for flow rate measurement and for conductivity measurement, for flow rate measurement and for liquid level measurement, for flow rate measurement, for conductivity measurement and for liquid level measurement, for conductivity measurement, for liquid level measurement or for conductivity measurement and liquid level measurement.

Magnetic-inductive flowmeters in which the measurement line at least partially has an electrically insulating cover layer are numerously known (compare German patent applications 10 2004 057 696 (U.S. Pat. No. 7,272,978), 10 2006 026 310, and 10 2006 026 311, German patent 43 27 826 and European patent application 0 608 793). The material for the cover layer which can have a layer thickness in the range from 0.1 to 500 microns, optionally even more, are generally plastics, for example polyurethane, polyolefin, polytetrafluoroethylene or polyether ether ketone. Otherwise in magnetic-inductive flowmeters, providing between the measurement line and the cover layer, often also called a liner, a primer which imparts adhesion of the cover layer to the measurement line is also known, and the primer can also be plastic of the same or another type.

SUMMARY OF THE INVENTION

It has already been stated above that, in spite of the fact that magnetic-inductive flowmeters have been extensively known for decades and in an almost unimaginable number of embodiments, and with reference to magnetic-inductive flowmeters progress is still desirable and also possible, this also applies especially to the measurement electrodes of these magnetic-inductive flowmeters. Consequently, a primary object of the invention is to embody and develop the known magnetic-inductive flowmeters underlying the invention with respect to functionally necessary measurement electrodes for improvement purposes.

A preferred embodiment of a magnetic-inductive flowmeter of the initially described type according to the invention is, first of all, essentially characterized in that the measurement electrodes are strip-shaped, have a length in the peripheral direction of the measurement line of roughly less than one fourth of the periphery of the measurement line up to roughly more than half of the periphery of the measurement line and have direct, i.e., electrically conductive, therefore galvanic contact with the flowing medium. This embodiment compared to the embodiments known in the prior art has functional advantages, especially with respect to design and production engineering. This applies especially, but not only, when according to another teaching of the invention which acquires special importance also for itself, therefore separately from what was stated above, the measurement electrodes are made of the same material or a similar material as the cover layer and the material of the measurement electrodes has a much higher electrical conductivity than the material of the cover layer.

It was stated above that the material for the cover layer is generally plastics, for example, polyurethane, polyolefin, polytetrafluorethylene or polyether ether ketone. If previously a special teaching of the invention is described that the measurement electrodes are made of the same material or a similar material as the cover layer, this must of course also be understood, for purposes of clarification or limitation, in that it must be implemented both for the same material and also for similar material, that the material of the measurement electrodes has a much high electrical conductivity than the material of the cover layer. Therefore, here, the same material can mean not an absolutely identical material.

For the above explained teaching of the invention which, as stated, acquires special importance, as explained, it is also essential that the material of the measurement electrodes has a much higher electrical conductivity than the material of the cover layer. The necessary higher electrical conductivity of the material of the measurement electrodes as compared to the electrical conductivity of the material of the cover layer can be achieved by a special chemical and/or physical treatment and/or by at least one additive. To what extent a special chemical and/or physical treatment and/or an additive or additives are necessary to achieve the material of the measurement electrodes having a much higher electrical conductivity than the material of the cover layer, of course, also depends mainly on whether, if the answer is yes, to what extent the material used for the measurement electrodes, even without a special chemical and/or physical treatment and without an additive, has a higher electrical conductivity than the material of the cover layer. The less the electrical conductivity of the material of the measurement electrodes initially differs from the electrical conductivity of the material of the cover layer, the more, of course, must be done so that, ultimately, the material of the measurement electrodes has a much higher electrical conductivity than the material of the cover layer.

In the past, the focus was solely on the fact that the material of the measurement electrodes had to have a much higher electrical conductivity than the material of the cover layer. However, it is also necessary that the electrical conductivity of the material of the measurement electrodes is much higher than the electrical conductivity of the flowing medium, preferably two to ten times higher. Here it must be considered in the design what electrical conductivity can be expected in the flowing medium.

The electrical conductivity for drinking water is roughly 500 μScm and for waste water roughly 5000 μScm.

It was already pointed out above that, in known magnetic-inductive flowmeters, the material for the cover layer is generally plastics, for example, polyurethane, polyolefin, polytetrafluorethylene or polyether ether ketone. These materials can also be used in the magnetic-inductive flowmeter according to the invention for the cover layer of the measurement line.

The material for the measurement electrodes can fundamentally be a polymer, for example, polyurethane (PUR), polyamide (PA), polyethylene/polyethene (PE), polypropylene/polypropene (PP), a plastic (PFA, PTFE, ETFE) known under the trademark Teflon, or rubber of the most varied types.

For the above explained teaching of the invention which acquires special importance, it is essential that the material of the measurement electrode has much higher electrical conductivity than the material of the cover layer. There are a host of possibilities for achieving this. In this regard, it was already pointed out above that the necessary higher electrical conductivity of the material of the measurement electrodes compared to the electrical conductivity of the material of the cover layer can be achieved by a special chemical and/or physical treatment and/or by at least one additive.

One especially preferred embodiment of the magnetic-inductive flowmeter according to the invention is characterized in that the material for the measurement electrodes is a polymer with extrinsic conductivity or a material with intrinsic conductivity.

Extrinsic conductivity designates the portion of the conductivity of a solid which is caused by the incorporation of foreign atoms (external influence→extrinsic) into the crystal lattice (compare "Wikipedia, the Free Encyclopedia"). The incorporation of foreign atoms is called doping. The foreign atoms cause an increase of conductivity since, depending on the their valence—they introduce additional voids or additional freely movable charges into the solid. The extrinsic conductivity at low temperatures is almost independent of temperature and also exists at 0 K.

Intrinsic conductivity arises by the solid (from itself→intrinsic) tending to form lattice faults, and thus, to enable charge motion, therefore, ion conduction, therefore to be electrically conductive (compare "Wikipedia, the Free Encyclopedia"). In a solid lattice, faults such as, for example, Schottky defects and Frenkel defects can occur. They are thermodynamically promoted since they entail a gain of entropy. The system accordingly tends to a certain degree to form defects. These faults are called intrinsic faults. The defect concentration is dependent on temperature. It rises with temperature and at 0 K has a value of zero. Intrinsic defects consequently at temperatures >0 K provide for mobile charges and thus for intrinsic electrical conductivity.

Materials with electrical conductivity can have both extrinsic conductivity and also intrinsic conductivity. At low temperatures extrinsic conductivity dominates, while with rising temperature it is covered by intrinsic conductivity (compare again "Wikipedia, the Free Encyclopedia").

In the magnetic-inductive flowmeter according to the invention, the additive or additives for the material of the measurement electrodes can be carbon, for example in the foam of graphite, also in the form of carbon fibers, metal or other electrical material, each preferably powdered or fibrous.

In the past, the focus was essentially on the electrical conductivity of the material of the measurement electrodes relative to the electrical conductivity of the cover layer, on the electrical conductivity of the material of the measurement electrodes relative to the electrical conductivity of the flowing medium, on especially suitable materials for the measurement electrodes and on aspects which influence the electrical conductivity of the measurement electrodes. However, the shape of the measurement electrodes, the arrangement of the measurement electrodes relative to the cover layer, possibilities of tapping the measurement voltage which has been detected by the measurement electrodes, and suitable and especially advantageous methods for producing the magnetic-inductive flowmeters according to the inventions are however important for the magnetic-inductive flowmeters according to the invention as will be explained below.

In preferred embodiments of the magnetic-inductive flowmeters according to the invention, the measurement electrodes—viewed on measurement electrodes in stretched, virtually "unwound" form—can have a rectangular shape or a shape which varies over the periphery of the measurement line, for example a triangular or rhombic shape. Otherwise the measurement electrodes can have a round, an elliptical, a square, a rectangular, an octagonal or a partially round and/or elliptical and/or square and/or rectangular and/or octagonal cross section. With respect to the shape of the measurement electrodes, it is pointed out that they can be rounded on their ends or can pass into a round cross section and/or that they can have a venturi-like cross section in the flow direction of the flowing medium.

It was stated above that a preferred embodiment of a magnetic-inductive flowmeter according to the invention is, first of all, essentially characterized in that the measurement electrodes are made strip-shaped, have a length in the peripheral direction of the measurement line of roughly less than one fourth of the periphery of the measurement line up to roughly more than half of the periphery of the measurement line and have direct, i.e., electrically conductive, therefore galvanic, contact with the flowing medium. This strip-shaped execution of the measurement electrodes can be a one-piece execution, but the measurement electrodes can also be formed of several component electrodes.

The arrangement of the measurement electrodes relative to the cover layer can be such that the surface of the measurement electrodes which faces into the interior of the measurement line is even with the surface of the cover layer which faces into the interior of the measurement line, the measurement electrodes, therefore, are virtually completely integrated in the cover layer. The flowing medium, therefore, finds a continuously smooth flow channel which does not have projections or offsets. However, it can also be advantageous to make the arrangement such that the surface of the measurement electrodes which faces into the interior of the measurement line projects or is set back relative to the surface of the cover layer which is pointed toward the interior of the measurement line. In this way, in the region of the measurement electrodes, flow situations can arise which lead to the measurement electrodes being able to especially easily detect the measurement voltage which has been induced in the flowing medium.

For a magnetic-inductive flowmeter of the type under consideration, exactly two electrodes are necessary for operation, perpendicular to the magnetic field and perpendicular to the flow direction of the flowing medium. However, it can also be advantageous to provide at least one reference electrode in addition to the two functionally necessary measurement electrodes. This can be recommended especially, but not only, when the magnetic-inductive flowmeter according to the invention is also to be used for conductivity measurement, for liquid level measurement, for conductivity measurement and for liquid level measurement, or only for conductivity measurement, for liquid level measurement or for conductivity measurement and for liquid level measurement. Regardless, it can be advantageous in the magnetic-inductive flowmeter according to the invention to arrange several measurement electrodes in succession in the flow direction of the flowing medium so that there are not only two measurement electrodes, but also, for example, four measurement electrodes or even six measurement electrodes. In this arrangement, on the one hand, the measurement voltages detected by the respective pairs of measurement electrodes can be averaged; this leads to a more accurate measurement result. The arrangement of several measurement electrodes in the flow direction of the flowing medium in succession can also have the advantage that virtually several measurement systems are available, for a total of four measurement electrodes, therefore, two measurement systems, for a total of six measurement electrodes, therefore, three measurement systems. This has the advantage that this magnetic-inductive flowmeter is and remains serviceable even when measurement of the rate of flow via two opposite measurement electrodes, is faulty or even fails, for whatever reason.

As already stated, the measurement voltage which has been detected by the measurement electrodes and which has been induced in the flowing medium must, of course, be tapped from the measurement electrodes. Therefore, routed to the outside from the "source", the interior of the measurement line, so that the induced and detected measurement voltage can be evaluated.

It was stated initially that the measurement voltage can be galvanically or capacitively tapped from the measurement electrodes. In the magnetic-inductive flowmeters according to the invention, galvanic tapping is recommended. Consequently, in the magnetic-inductive flowmeters according to the invention, at least one terminal element which leads to the outside is preferably assigned to the measurement electrodes. In particular, the measurement electrodes, the cover layer and the measurement line can each have at least one through hole and the terminal elements can be routed through the through holes of the measurement electrodes, the cover layer and the measurement line. In this embodiment, the terminal elements can be provided with a preferably lens-shaped head which rests on the measurement electrodes within the measurement line. Another embodiment of the magnetic-inductive flowmeters with respect to tapping of the measurement voltage which has been detected by the measurement electrodes and which has been induced in the flowing medium is characterized in that the measurement electrodes are provided with preferably circular-cylindrical terminal receivers which penetrate the cover layer and the measurement line; these terminal receivers can preferably be made integral with the measurement electrodes. In this embodiment, it is then recommended that the terminal elements be made pin-shaped and inserted into the terminal receivers of the measurement electrodes.

The teaching of the invention includes not only the magnetic-inductive flowmeter described above in various embodiments, but rather the teaching of the invention also includes preferred methods for producing magnetic-inductive flowmeters which focus on the cover layer, the measurement electrodes, the implementation of the cover layer and the measurement electrodes, and the connection of the measurement electrodes to the cover layer.

First of all, a method according to the invention for producing a magnetic-inductive flowmeter of the type under consideration, in which the cover layer and the measurement electrodes are made of rubber, is characterized in that the measurement electrodes are vulcanized into the cover layer or onto the cover layer. It goes without saying that in this magnetic-inductive flowmeter in which, therefore, the cover layer and the measurement electrodes are made of rubber, as in all magnetic-inductive flowmeters according to the invention, provision must also be made for the material of the measurement electrodes having a much higher electrical conductivity than the material of the cover layer which, for the material rubber used for the measurement electrodes, therefore, contains at least one additive which produces the necessary electrical conductivity.

Another preferred method for producing a magnetic-inductive flowmeter of the type under consideration in which the cover layer and the measurement electrodes are made of a polymer, is characterized in that the measurement electrodes are melted into the cover layer or onto the cover layer. In this method, because the cover layer and the measurement electrodes are made of a polymer which implements, what was described above as an important teaching of the invention, that specifically the measurement electrodes are made of the same material or a similar material as the cover layer, is implemented.

According to another teaching of the invention, magnetic-inductive flowmeters according to the invention can also be produced by the cover layer and the measurement electrodes being implemented in dual-component injection or spraying in one procedure.

A method for producing a magnetic-inductive flowmeter acquires special importance which is characterized in that the material for the measurement electrodes is applied to the cover layer in the PVD method or in the CVD method (for the PVD method and the CVD method reference is made to BROCKHAUS DIE ENZYKLOPAEDIE, twentieth revised and updated edition, 1996, for the PVD method to Volume 17, p. 635, left column, and for the CVD method to Volume 15, page 33, left column.

In the prior art, MID technology (MID="Molded Interconnect Device"), especially also 3D-MID technology, has become known (see, the article "From flexible circuit board solution to mechantronic 3D unit—A flexible and economical alternative" by Dirk Baecker, Polyscope' October 2008, Verlag: Binkert Medien AG, Switzerland, issue October 2008, pages 18 and 19). On this basis, an especially preferred embodiment of the method for producing a magnetic-inductive flowmeter of the type under consideration is characterized in that first a cover layer which is suitable for the MID method is applied to the inner surface of the measurement line or to part of the inner surface of the measurement line of a material containing suitable additives, for example, by an injection molding method, that then the additives contained in the material of the cover layer are activated and that, finally, the measurement electrodes are applied to the cover layer which has been pretreated as described. Here, it is recommended that the additives contained in the material of the cover layer be activated by a laser structuring process (see, the literature citation given above).

In the magnetic-inductive flowmeters underlying the invention it is important that, between the measurement line and the cover layer, there is an especially good, tight, especially also crack-free interconnection which is stable under all operating conditions. This applies in the same manner to the interconnection between the cover layer and the measurement electrodes or between the measurement electrodes and the cover layer; this is achieved when one of the above described methods is expertly applied. The above described interconnection between the cover layer and the measurement electrodes or between the measurement electrodes and the cover layer leads to the desired, often even necessary result that solid, liquid and gaseous substances, especially impurities of any type, especially also bacteria, cannot settle.

In particular, there is a plurality of different possibilities for implementing, embodying, developing and producing the magnetic-inductive flowmeter according to the invention. In this regard reference is made to the following description of a magnetic-inductive flowmeter according to the invention in conjunction with the accompanying drawings.

DETAILED DESCRIPTION OF THE INVENTION

Figure 1:
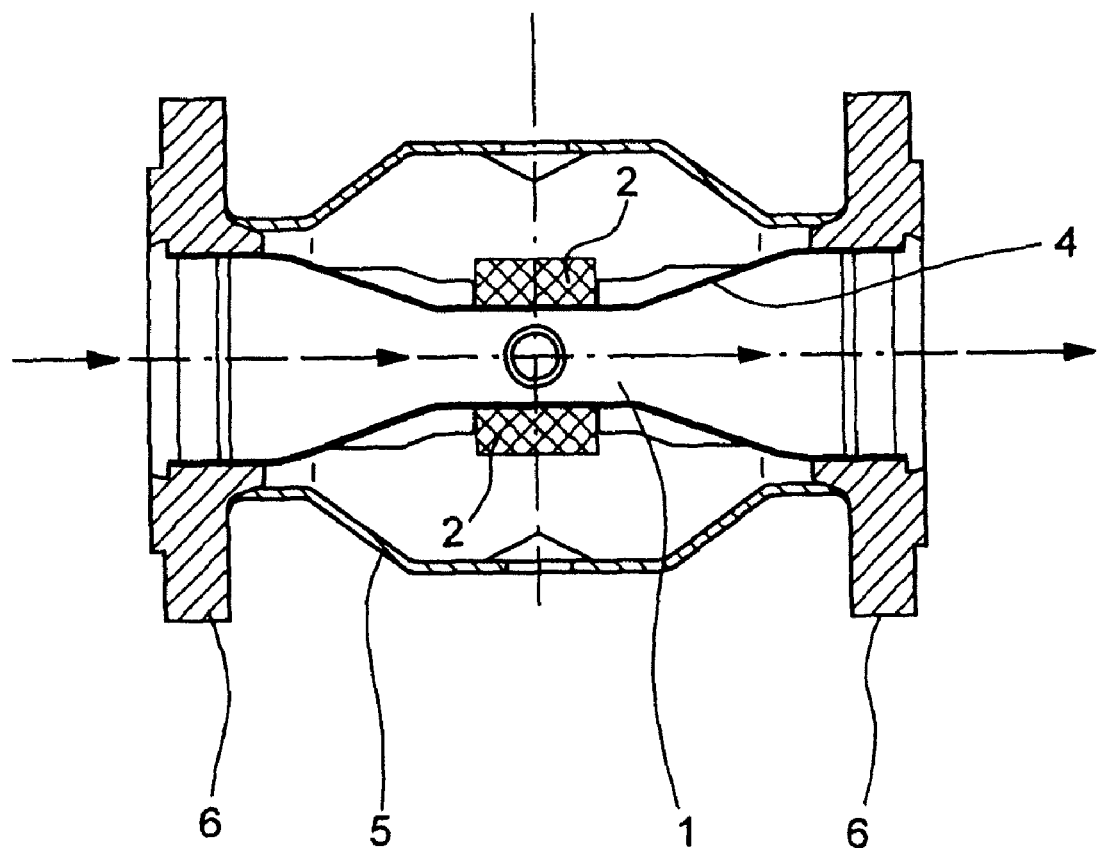
FIG. 1 shows, highly schematically, a lengthwise section through a preferred embodiment of a magnetic-inductive flowmeter according to the invention.

The magnetic-inductive flowmeter which is shown essentially only schematically in FIG. 1 is designed for measurement of the flow rate of a flowing medium. However, it is also suitable for flow rate measurement and for conductivity measurement, for flow rate measurement and for liquid level measurement, for flow rate measurement, for conductivity measurement and for liquid level measurement, for conductivity measurement (without flow rate measurement), for liquid level measurement (without flow rate measurement) as well as for conductivity measurement and for liquid level measurement (without flow rate measurement).

The magnetic-inductive flowmeter shown in FIG. 1 has, as is necessary for operation, a measurement line 1, a magnetic field generating means (not shown) for generating a magnetic field which at least partially penetrates the measurement line 1, which includes two magnetic coils 2, only schematically represented in FIG. 1, and two measurement electrodes 3 for detecting and tapping the measurement voltage which has been induced in the flowing medium. It is also important for the magnetic-inductive flowmeter shown in FIG. 1 that the measurement line 1 is at least partially provided inside with an electrically insulating cover layer 4.

The magnetic-inductive flowmeter shown in FIG. 1 also includes a housing 5 which holds the measurement line 1, the magnetic field generating means and the measurement electrodes 3, and which has a round cross section and is provided on both sides with flanges 6 in the illustrated embodiment.

Figure 2:
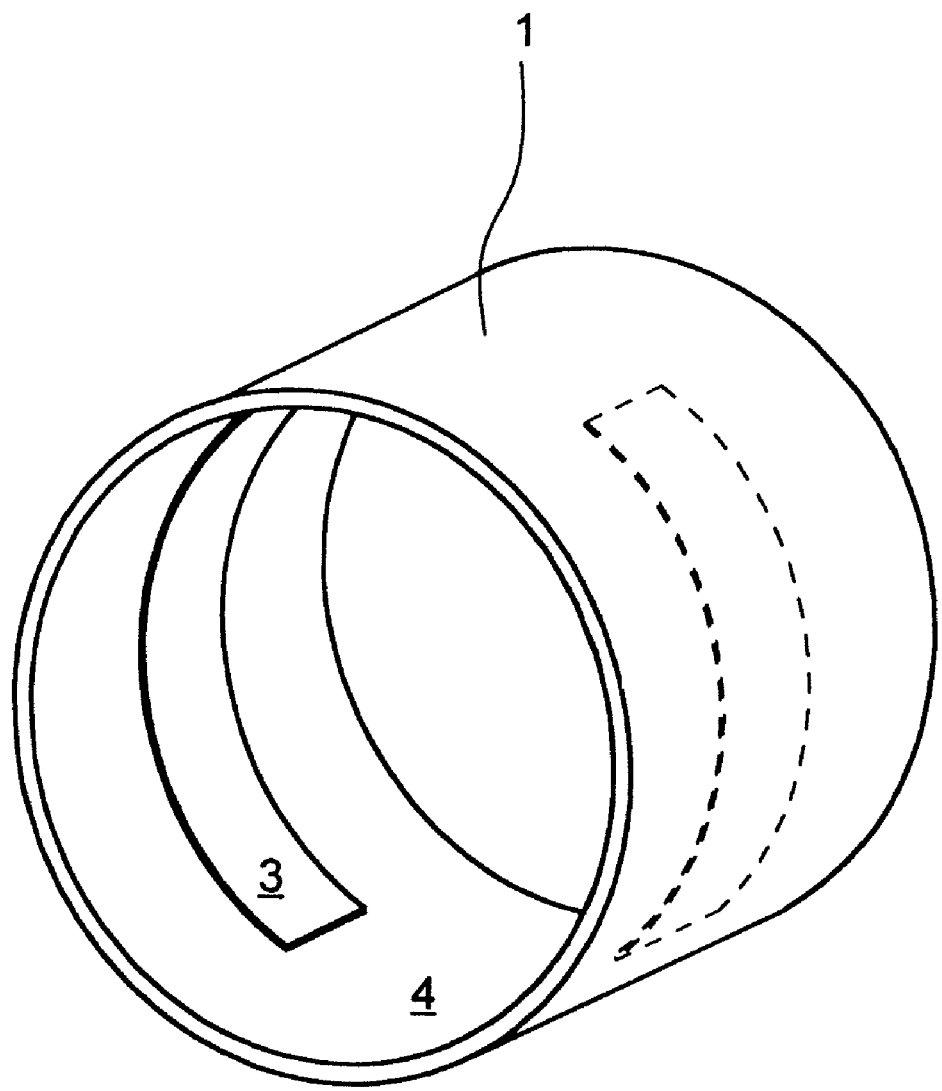
FIG. 2 is a perspective view, which is enlarged as compared to FIG. 1, of the middle part of the measurement line of the magnetic-inductive flowmeter as shown in FIG. 1.
Figure 3:
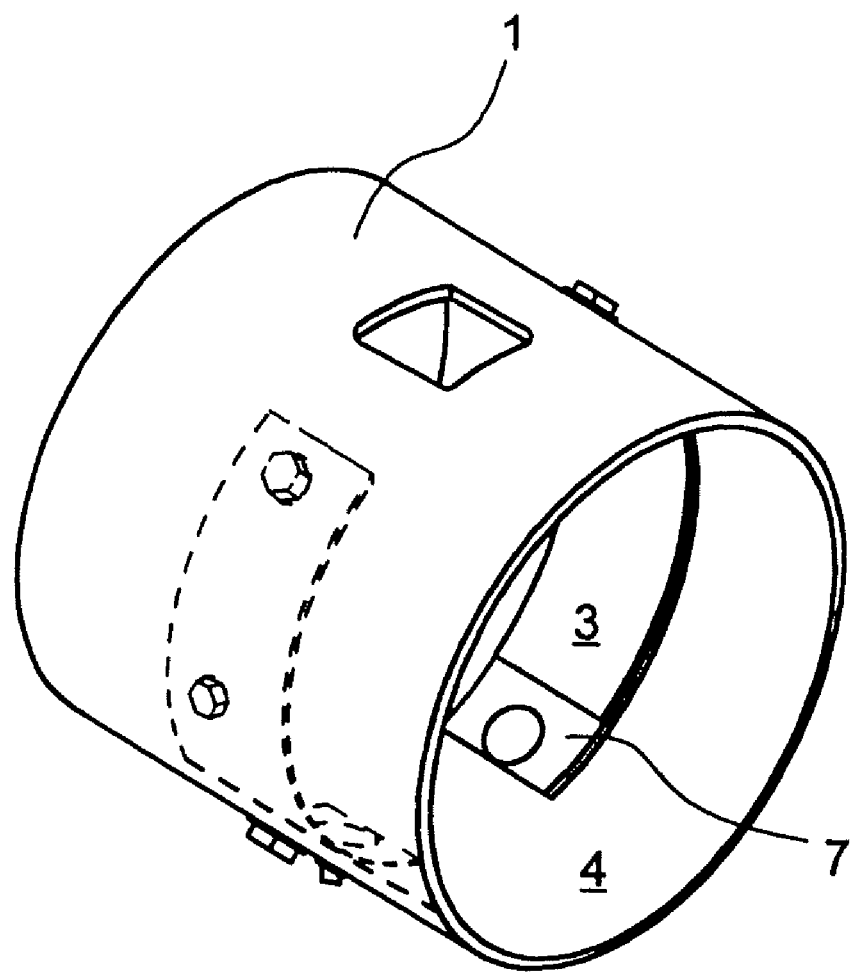
FIG. 3 is a perspective view of the middle part of the measurement line of the magnetic-inductive flowmeter as shown in FIG. 1, which corresponds to FIG. 2, with other details suggested.

According to a first teaching of the invention, in the magnetic-inductive flowmeter according to the invention, as shown in FIGS. 2 & 3, the measurement electrodes 3 are strip-shaped. They have a length in the peripheral direction of the measurement line 1 of roughly less than one fourth of the periphery of the measurement line up to roughly more than half of the periphery of the measurement line, and they have direct, i.e., electrically conductive, therefore galvanic, contact with the flowing medium.

According to another teaching of the invention, it is important for the magnetic-inductive flowmeter according to the invention that the measurement electrodes 3 are made of the same or a similar material as the cover layer 4 and the material of the measurement electrodes 3 has a much higher electrical conductivity than the material of the cover layer 4. In the embodiment shown, the electrical conductivity of the material of the measurement electrodes 3 in the radial direction, in the direction of flow of the flowing medium, and in the direction of the periphery of the measurement line is the same. However, it is also possible to make the electrical conductivity of the material of the measurement electrodes 3 variable in the radial direction, in the flow direction of the flowing medium and/or in the direction of the periphery of the measurement line.

Furthermore, it applies to the preferred embodiment of a magnetic-inductive flowmeter according to the invention that the electrical conductivity of the material of the measurement electrodes 3 is increased by a special chemical and/or physical treatment and/or by at least one additive. It is also important that the electrical conductivity of the material of the measurement electrodes 3 is roughly twice to roughly 10 times higher than the electrical conductivity of the flowing medium.

It cannot be recognized in the figures what is being used as the material for the measurement electrodes 3 and for the cover layer 4. Nor can it be taken from the figures how provision is made according to the invention for the fact that, in the magnetic-inductive flowmeter according to the invention, that the material of the measurement electrodes 3 has a much higher electrical conductivity than the material of the cover layer 4. However, it is noted that the material for the measurement electrodes can be a polymer, for example, polyurethane (PUR), polyamide (CA), polyethylene/polyethene (PE), polypropylene/polypropene (PP), a polymer (PFA, PTFE, ETFE) known under the trade name "Teflon", or a rubber. Furthermore, the material for the measurement electrodes 3 can be a polymer with extrinsic conductivity, a material with intrinsic conductivity or a material with extrinsic and intrinsic conductivity. When additives are used to provide conductivity, the additive or additives for the material of the measurement electrodes 3 is carbon, for example, in the form of graphite or carbon fibers, or metal or other electrically conductive material, preferably in powder or fibrous form.

As FIGS. 2 & 3 show, in the illustrated embodiment, the measurement electrodes 3—in flat form—have a rectangular shape. However, they could also have a shape which varies over the periphery of the measurement line, for example, a triangular or a rhombic shape. Also, the measurement electrodes 3 can be rounded on their ends or can pass into a round cross section.

In the illustrated embodiment of FIGS. 2 & 3, the measurement electrodes 3 are made in one piece over their entire length in the peripheral direction of the measurement line 1. However, it is also possible to make the measurement electrodes from several component electrodes.

In the past, a magnetic-inductive flowmeter was described which had two measurement electrodes 3. In addition to the measurement electrodes 3, as shown in FIG. 3, at least on reference electrode 7 can also be provided. This applies especially when the magnetic-inductive flowmeter according to the invention is to be used not only for measuring the flow rate of a flowing medium, but also for measuring conductivity, and/or for liquid level measurement.

Figure 4:
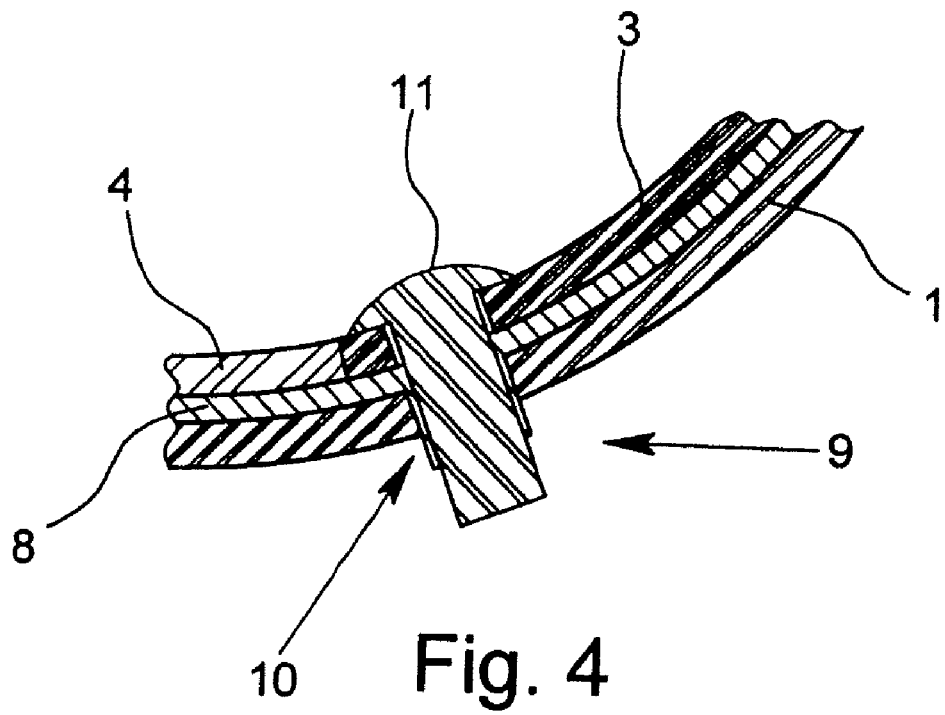
FIG. 4 shows a preferred implementation of tapping of the measurement voltage which has been detected by the measurement electrodes and which has been induced in the flowing medium.
Figure 5:
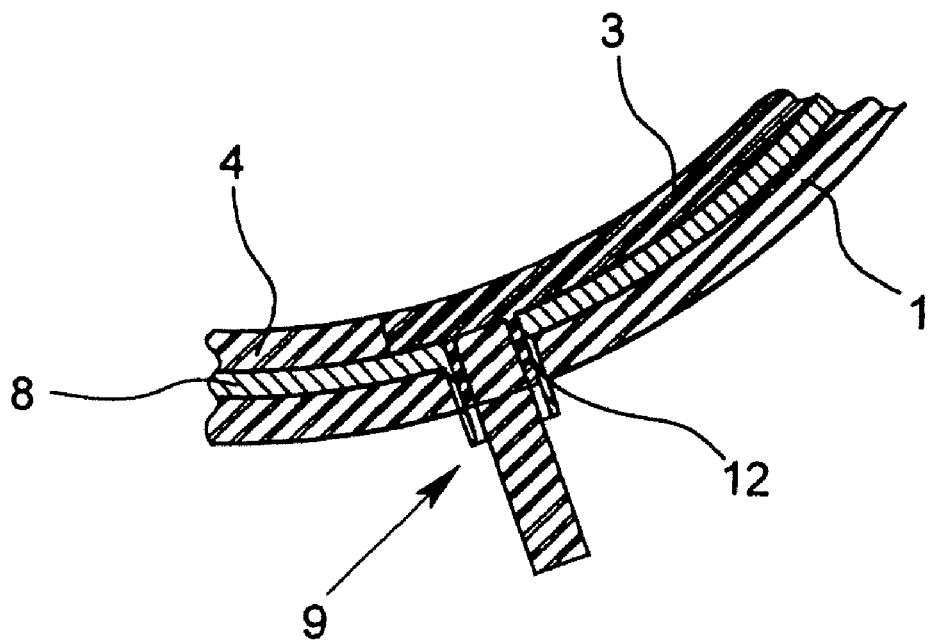
FIG. 5 shows a second preferred implementation of tapping of the measurement voltage which has been detected by the measurement electrodes and which has been induced in the flowing medium.

As shown most clearly in FIGS. 4 & 5, in the illustrated embodiment, the surface of the measurement electrodes 3 which faces into the interior of the measurement line 1 is flush with the surface of the cover layer 4 which faces into the interior of the measurement line 1. However, it is also possible to make the dimensioning such that the surface of the measurement electrodes 3 which faces into the interior of the measurement line 1 projects or is set back relative to the surface of the cover layer 4 which faces into the interior of the measurement line 1.

In the magnetic-inductive flowmeter according to the invention, tapping of the measurement voltage which has been detected by the measurement electrodes 3 and which has been induced in the flowing medium takes place galvanically. Therefore, in the illustrated embodiment, a respective terminal element 8 which leads to the outside is assigned to each of the measurement electrodes 3.

In the embodiment as shown in FIG. 4, this is implemented, in particular, such that the measurement electrodes 3, the cover layer 4 and the measurement line 1 each have a through-hole 9 and the terminal elements 8 are routed through the through holes 9 of the measurement electrodes 3, the cover layer 4 and the measurement line 1. Here, as shown in FIG. 4, the terminal elements 8 are provided with a preferably lens-shaped head 11 which rests on the measurement electrodes 3 within the measurement line 1.

Conversely, FIG. 5 shows an implementation of galvanic tapping of the measurement voltage which has been detected by the measurement electrodes 3 and which has been induced in the flowing medium, which is characterized in that the measurement electrodes 3 are provided with circular-cylindrical terminal receivers 12 which penetrate the cover layer 4 and the measurement line 1. Here, the terminal elements 8 are made pin-shaped and are inserted into the terminal receivers 11 of the measurement electrodes 3.

What is claimed is:

1. Magnetic-inductive flowmeter for measuring the rate of flow of a flowing medium, comprising:
   a measurement line,
   a magnetic field generating means for generating a magnetic field which at least partially penetrates the measurement line, and
   two measurement electrodes for detecting and tapping a measurement voltage which has been induced in the flowing medium,
   wherein an electrically insulating cover layer provided at least partially over the inside of the measurement line,
   wherein the measurement electrodes are adapted for galvanically or capacitively tapping the measuring voltage and wherein the measurement electrodes are strip-shaped having a length in a peripheral direction of the measurement line of between about just under one fourth of the periphery of the measurement line up to just about over half of the periphery of the measurement line and are in direct electrically-conducting or galvanic contact with the flowing medium; and
   wherein the measurement electrodes are made of the same material or similar material as the cover layer and the material of the measurement electrodes has a much higher electrical conductivity than the material of the cover layer.

2. Magnetic-inductive flowmeter according to claim 1, wherein the material of electrodes has an electrical conductivity that varies in at least one of the radial direction, the direction of flow of the flowing medium and the circumferential direction of the measurement line.

3. Magnetic-inductive according to claim 1, wherein the material of the measurement electrodes has an increased conductivity, due to at least one of a chemical treatment, physical treatment and the inclusion of at least one additive, to approximately twice to about ten times higher than the electrical conductivity of the flowing medium.

4. Magnetic-inductive flowmeter according to claim 1, wherein the material for the measurement electrodes is a polymer with at least one of extrinsic conductivity and intrinsic conductivity.

5. Magnetic-inductive flowmeter according to claim 1, wherein carbon in the form of one of graphite, carbon fibers, metal and another electrically conductive material is provided as an additive for the material of the measuring electrodes.

6. Magnetic-inductive flowmeter according to claim 1, wherein the measurement electrodes, when viewed in plan, have one of a rectangular, triangular and rhombic shape and the measurement electrodes have one of round, elliptical, square, rectangular, octagonal, partially round, elliptical shape in cross section.

7. Magnetic-inductive flowmeter according to claim 1, wherein the measuring electrodes are at least one of rounded on their ends, merge into a circular cross section, have a venturi-shaped cross section in the direction of flow of the flowing medium and are formed of multiple partial electrodes.

8. Magnetic-inductive flowmeter according to claim 1, any wherein a surface of the measurement electrodes which faces into the interior of the measurement line is flush with a surface of the cover layer which faces into the interior of the measurement line.

9. Magnetic-inductive flowmeter according to claim 1, wherein multiple measuring electrodes are arranged consecutively in the direction of flow of the flowing medium.

10. Magnetic-inductive flowmeter according to claim 1, wherein the measurement electrodes, the cover layer and the measurement line each have at least one respective through hole and terminal elements routed through the through holes of the measuring electrodes, the cover layer and the measurement line.

11. Magnetic-inductive flowmeter according to claim 10, wherein the terminal elements are provided with a lens-shaped head which rests on the measurement electrodes within the measurement line.

12. Magnetic-inductive flowmeter according to claim 1, wherein the measurement electrodes are provided with cylindrical terminal receivers which penetrate the measurement line and the cover layer and the terminal elements are pin-shaped and are inserted into the terminal receivers of the measurement electrodes.

13. Magnetic-inductive flowmeter according to claim 1, wherein a surface of the measurement electrodes which faces into the interior of the measurement line is flush with a surface of the cover layer which faces into the interior of the measurement line.

14. Magnetic-inductive flowmeter according to claim 1, wherein at least one additional pair of measurement electrodes is positioned at least one of up downstream and downstream of said two measurement electrodes relative to flow direction of the flowing medium.

15. Magnetic-inductive flowmeter according to claim 1, wherein a terminal element leading to the outside of the measurement line is associated with each of the measurement electrodes.

16. Magnetic-inductive flowmeter according to claim 15, wherein the measurement electrodes, the cover layer and the measurement line each have a respective through hole through which a respective one of the terminal elements is routed.

17. Magnetic-inductive flowmeter according to claim 16, wherein the terminal elements are provided with a lens-shaped head which rests on the measurement electrodes within the measurement line.

18. Magnetic-inductive flowmeter according to claim 15, wherein the measurement electrodes are provided with cylindrical terminal receivers which penetrate the measurement line and the cover layer.

19. Magnetic-inductive flowmeter according to claim 18, wherein the terminal elements are made pin-shaped and are inserted into the terminal receivers of the measurement electrodes.

* * * * *